United States Patent [19]

Gilman

[11] Patent Number: 5,433,438
[45] Date of Patent: Jul. 18, 1995

[54] BALL FOR PLAY, THERAPY AND SPORTS TRAINING AND METHOD OF MANUFACTURE

[75] Inventor: Neil Gilman, Glastonbury, Conn.

[73] Assignee: Marty Gilman, Inc., Gilman, Conn.

[21] Appl. No.: 291,730

[22] Filed: Aug. 16, 1994

Related U.S. Application Data

[63] Continuation of Ser. No. 906,755, Jun. 30, 1992, abandoned.

[51] Int. Cl.⁶ .............................................. A63B 37/02
[52] U.S. Cl. .................................. 273/58 A; 273/220
[58] Field of Search .............. 273/58 R, 58 A, 58 BA, 273/58 J, 58 K, DIG. 2, DIG. 8, 65 ED, 65 EE, 220, 230, 235 R

[56] References Cited

U.S. PATENT DOCUMENTS

| | | | |
|---|---|---|---|
| 744,718 | 11/1903 | Cassidy | 273/58 K |
| 777,478 | 12/1904 | Minor . | |
| 2,078,382 | 4/1937 | Hanshaw | 273/58 K |
| 2,989,782 | 6/1961 | Barkhuff, Jr. et al. | 273/58 J |
| 3,053,539 | 9/1962 | Piechowski | 273/DIG. 2 |
| 3,111,317 | 11/1963 | Cituk | 273/55 A |
| 3,206,201 | 9/1965 | Hendricks | 273/DIG. 2 |
| 3,350,252 | 10/1967 | Twickler | 273/DIG. 2 |
| 3,927,882 | 12/1975 | Galarza | 273/58 A |
| 3,942,793 | 7/1976 | Lombardo | 273/26 R |
| 4,463,951 | 8/1984 | Kumasaka et al. | 273/58 BA |
| 4,598,909 | 7/1986 | Ventura et al. | 273/60 B |
| 4,616,827 | 10/1986 | Bergland | 273/58 A |
| 4,660,830 | 4/1987 | Tomar | 273/DIG. 8 |
| 4,802,671 | 2/1989 | Gentiluomo | 273/DIG. 8 |
| 5,028,053 | 7/1991 | Leopold | 273/58 K |
| 5,035,425 | 7/1991 | Edwards | 273/58 J |
| 5,131,665 | 7/1992 | Myers | 273/58 A |

OTHER PUBLICATIONS

Roy Carlson, Last-A-Foam Pla-Maker Ball, General Plastics Manufacturing Company, 3481 So. 35th Street, Tacoma, Washington 98409.
Roy Carlson, Let's Have A Ball, "The Washington Coach," vol. XXV, Fall Issue, Oct. 1, 1972, No. 1.
A Super Bowl Is Fantasyland, "The Honolulu Advertiser," Sports Report, Thursday, Jan. 22, 1987.
"The Denver Post," College Football, Thursday, Dec. 27, 1990.
The Hardest-Working Medicine Balls Around, Dynamax, 6901 Woodrow Avenue, Austin, Texas 78757.
Kevin Simpson, The Master Of Disaster, "Sport," Dec. 1985, pp. 63, 65 & 66.
Lineaus Athletic Products, Lineaus Athletic Company, Route 1, Box 159, Kyle, Texas 78640.
Price List, Spring 1988, Lineaus Athletic Company, Route 1, Box 159, Kyle Texas 78640.
The Cat Ball, "Coaches, Inc.," Suite 320, 5025 Ward Road, Wheat Ridge, Colo. 80033.
Picture: "Denver coach Dan Reeves Leans against a medicine ball while watching the Broncos practice Tuesday in Irvine, California".
Lineaus Products Brochure, Lineaus Athletic Company, Rout 1 Box 159 Kyle Tex. 78640.
The Tested-Proven Last-A-Foam TM Ball, General Plastics Manufactyuring Company, P.O. Box 9097, Tacoma, Wash. 98409.

*Primary Examiner*—Vincent Millin
*Assistant Examiner*—Steven B. Wong
*Attorney, Agent, or Firm*—Fish & Richardson

[57] ABSTRACT

A ball is provided which includes a rigid core surrounded by an outer layer of foamed polyurethane. The core and outer layer are preferably both integral spheres, i.e. are not formed from separate hemispheres.

In preferred embodiments, the core is expanded polystyrene, and the outer layer is formed of an integral skin foam, i.e., a foam having a smooth non-porous skin over a microcellular open cell foam, and the foam is the reaction product of a MDI prepolymer, e.g., diphenylmethane diisocyanate prepolymer, and a urethane resin.

28 Claims, 3 Drawing Sheets

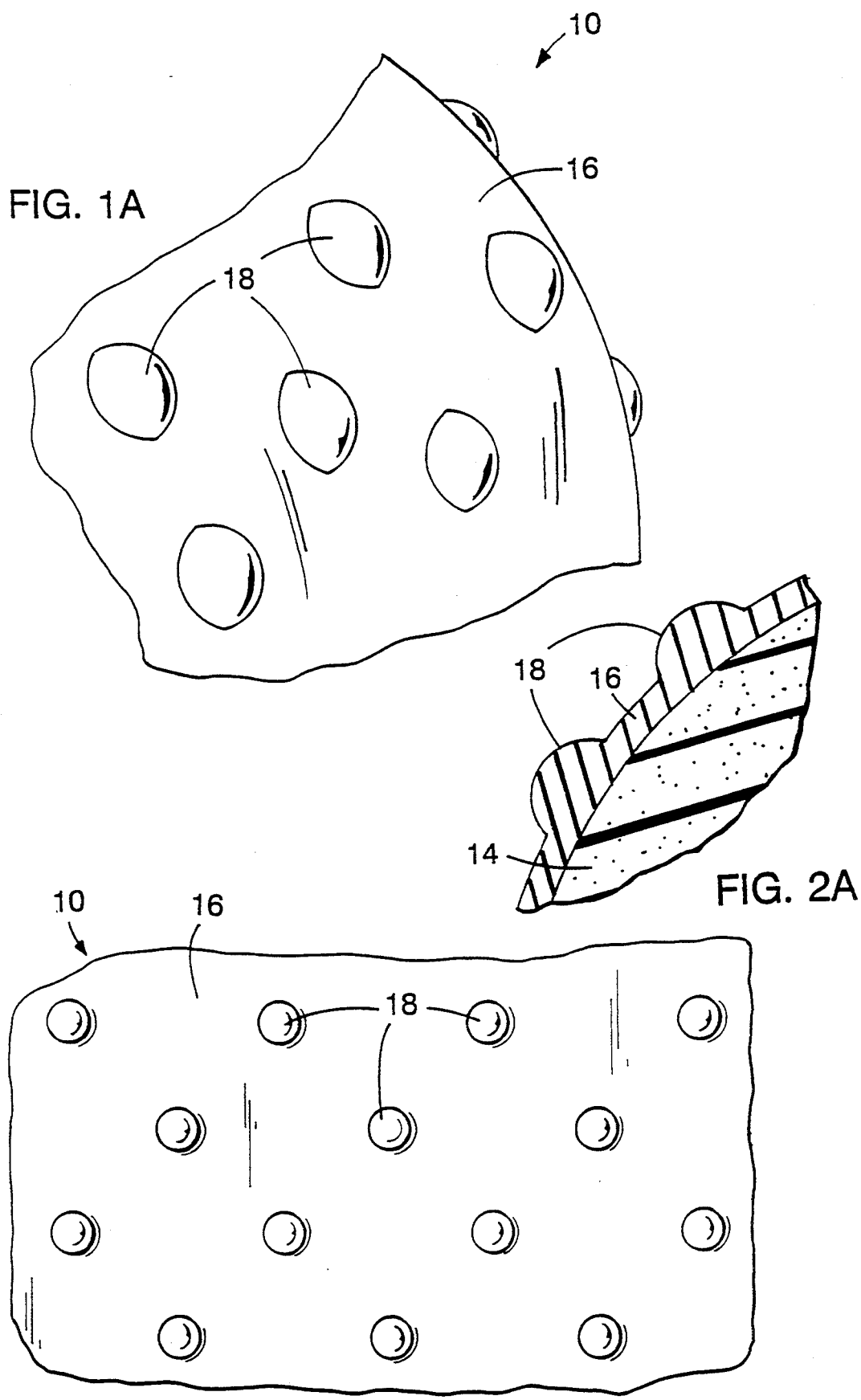

BALL FOR PLAY, THERAPY AND SPORTS TRAINING AND METHOD OF MANUFACTURE

This application is a continuation of U.S. application Ser. No. 07/906,755, filed Jun. 30, 1992, now abandoned.

BACKGROUND OF THE INVENTION

The invention relates to a ball for use, e.g., in football training, physical therapy, and early childhood physical education.

The use of large, heavy balls, known as "medicine balls" for weight training, has long been known. Medicine balls have traditionally consisted of a stiched leather cover filled with heavy wool shearings, KAPOK filler or the like. These balls have a tendency to deform or lose their shape because of the softness and pliability of their stuffing. Further, it is difficult to make a large diameter ball (greater than 18") using this construction because the weight of the filler would make it excessively heavy. Outdoor use of medicine balls is typically impracticable because the elements have a deleterious effect on the ball, e.g., the filler is susceptible to rotting and the surface is slippery when wet.

In 1970, General Plastics Manufacturing Co. introduced a large, heavy ball for use as a football training tool, sold under the trademark LAST-A-FOAM® ball. This ball was 30" in diameter with an inner core of plastic and an outer covering of vinyl. The ball was assembled by adhering two halves together to form a ball.

While the LAST-A-FOAM® ball overcame some of the problems associated with making a large diameter ball having a reasonable weight, the ball had other defects, such as a tendency to develop surface cracks, split in half along the glue seam where the two halves were adhered together, and become slippery when wet.

SUMMARY OF THE INVENTION

The invention features a ball which is useful for a variety of applications, e.g., football training, physical therapy, and early childhood physical education. The non-bouncing ball includes a rigid core surrounded by a molded layer of foamed flexible polyurethane. The core and the outer layer are bonded together during the molding process to form an integral sphere, i.e., the ball is not made by assembling two hemispheres.

In preferred embodiments, the core is a rigid lightweight material which may be foamed or non-foamed, more preferably is expanded polystyrene, and the outer layer is formed of a molded integral skin foam. The term "integral skin foam", as used herein, refers to a foam having a smooth non-porous skin over a microcellular open cell foam. Preferably, the foam is the reaction product of a MDI prepolymer, e.g., diphenylmethane diisocyanate prepolymer, and a urethane resin, and the skin is from about ⅛ to ¼ inch thick.

In other preferred embodiments, the ball has a textured surface, to enable it to be more easily gripped and maneuvered, even when wet. Preferably, the surface is "pebbly", i.e., the surface has a plurality of small bumps distributed on its surface. It is further preferred that the ball have an outer diameter of less than about 30 inches, more preferably 20 to 28 inches, and that the inner core comprise about 60 to 70 percent of the volume of the ball, more preferably about 63 percent.

In another aspect, the invention features a ball comprising a spherically shaped body, at least the outer portion of which comprises an integral skin foam, having on its surface a plurality of protrusions, said ball having a diameter of at least 20 to 28 inches and a weight of from 18 to 28 pounds.

In its method aspects, the invention features a method of manufacturing a ball of the invention, including the steps of providing a solid spherical core, supporting the core in approximately the center of a spherical mold, dispensing a foaming polyurethane composition into the mold, and revolving the mold a predetermined number of times, preferably at least twice, to fill the entire mold with foamed material. In preferred embodiments, the core is supported in the mold by a rod which passes through the approximate center of the core, and the mold is revolved as soon as all of the polyurethane composition is dispensed into the mold. Preferably, the reaction rate of the polyurethane composition is slow enough, or dispensing rapid enough, that the composition has not yet or has just begun to foam ("cream") when the mold is revolved. Preferably, the first revolution of the mold is completed by the time the foam begins to cream, i.e. the time at which, after mixing the two components to form the polyurethane composition, the composition begins to foam.

In another aspect, the invention features a method of molding a sphere, at least the outer layer of which is a polyurethane foam, including the process of pouring a foaming polyurethane composition into a spherical mold, and revolving the mold a predetermined number of times, preferably at least twice, during foaming of the composition. Preferably, the first revolution is made at the cream time of the composition.

The ball of the invention is extremely durable, due to its integral construction, its tough surface skin, and the ability of the textured surface to dissipate force applied to the surface. Further, the resiliency of the foam and the textured surface of the ball reduce the incidence of hand discomfort and potential injury in users, and the textured surface provides tactile sensitivity and a positive grip, even when the ball is wet.

Other features of the invention will be apparent from the description of the preferred embodiment and from the claims.

BRIEF DESCRIPTION OF THE DRAWINGS

FIGS. 1a and 1b are enlarged views of portions of the surface of the ball (details A and C, respectively, of FIG. 1).

FIG. 2a is an enlarged view of detail B of FIG. 2, showing the internal structure of the foam layer.

DESCRIPTION OF THE PREFERRED EMBODIMENT

Figure 1:
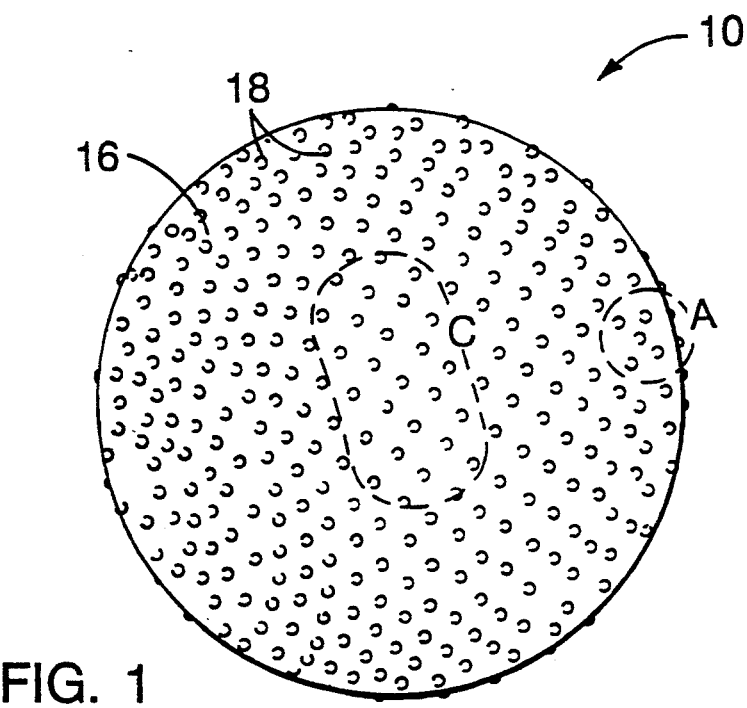
FIG. 1 is a perspective view of a ball according to one embodiment of the invention.

Referring to the figures, ball 10 preferably includes a core 12, which is approximately centered within an outer layer 14. Ball 10 preferably has a total weight of from about 18 to 28 pounds, preferably about 27 pounds, and a diameter of about 20 to 28 inches, preferably about 28 inches.

Core 12 is a rigid lightweight sphere which may be foamed or non-foamed. It is preferred that the core be solid, but, if desired, it may be hollow. It may be formed from any rigid material having a suitable density, preferably between 1 and 2 pounds/cubic foot. Suitable core materials include expanded polystyrene, foamed rigid polyurethane, and a composite of polyester and urethane. If expanded polystyrene is selected, the sphere can be cut from a solid block of expanded polystyrene. If a polyurethane foam or a composite of polyester and urethane is selected, it may be molded using techniques and molds similar to those used in molding the outer layer of integral skin foam.

Core 12 preferably has a diameter of about 3 to 5 inches less than the diameter of the ball itself, more preferably about 24 inches, and a weight of about 1 to 3 pounds, more preferably 2 pounds.

Outer layer 14 is preferably a foamed polyurethane, having a smooth non-porous skin over a microcellular open cell foam. The foam is preferably the reaction product of a MDI prepolymer, e.g., diphenylmethane diisocyanate prepolymer, and a urethane resin. A preferred urethane resin is a proprietary material available from BASF, under the tradename WUC 28083R. Other suitable isocyanate prepolymers and urethane resins include those which, in combination, would form an integral skin foam. Such compositions could be readily determined by those skilled in the art. The mix ratio of urethane resin to isocyanate prepolymer in the preferred composition is preferably about 100:37. The density and firmness of the foam, for a given composition, are a function of the packing of the material, i.e. the amount of the composition which is dispensed into the mold. The preferred packing for the finished ball is from about 12 to 18 lbs/cubic foot.

Preferably, the foam layer is from about 1 to 5, preferably 2 inches thick. If the foam layer is too thick, the ball may be excessively heavy or hard, whereas if the foam layer is too thin the foam may be excessively soft or it may separate from the core and may not adequately dissipate force applied to the surface of the ball. The foam preferably has a free rise density of about 5 to 10 lbs/cubic foot, and a molded density of from about 6 to 20 lbs/cubic foot, preferably 7 to 10 lbs/cubic foot.

Figure 2:
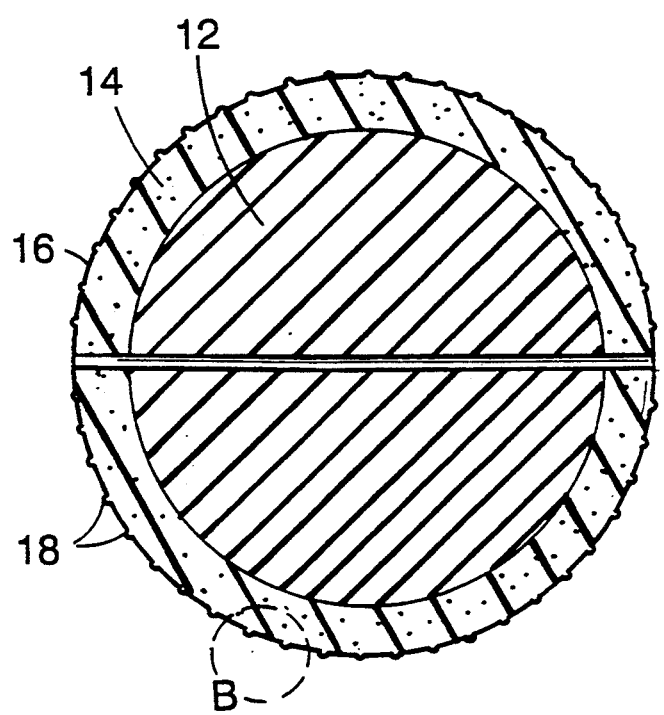
FIG. 2 is a cross-sectional view of the ball of FIG. 1, taken along line 2—2.

As shown in FIG. 2a, the outer layer 14 has a smooth, non-porous skin 16. Skin 16 preferably has a Shore hardness of about 50A initially, and 48A after 5 seconds, a tensile strength of about 1000 psi, and a high tear strength. It is preferred that skin 16 have a thickness of about ⅛ to ¼ inch. Molded into the surface of outer layer 14 are protrusions 18, which give the ball a "pebbly" surface. Protrusions 18 are preferably raised hemispheres, as shown in FIG. 1a, which are evenly spaced over the surface of the ball and are arranged in a plurality of concentric circles. The concentric circles are offset so that the protrusions in alternating circles mirror each other, and any two adjacent protrusions in one circle form an isoceles triangle with a protrusion in either adjacent circle (see FIG. 1b). This arrangement distributes the hemispheres in a uniform and even pattern over the surface of the ball and tends to equalize the dissipation of force which is applied to the surface of the ball. Preferably, the protrusions extend about 1/32 to ⅜ inch, more preferably 1/16 inch, above the surface of the ball, have a diameter of from about ¼ to ½ inch, more preferably about ⅜ inch, and are spaced about 1 inch apart. In addition to distributing forces over the surface of the ball, the protrusions allow the ball to be easily gripped, even when wet, and provide tactile sensitivity for play and therapy applications.

The outer layer may include colorants, to provide a ball of any desired color. A fluorescent pigment is preferred, most preferably fluorescent red, to make the ball eye-catching, attractive and lively-looking. The fluorescent color makes the ball highly visible for sport training and has an attraction for children. Pigment is preferably homogenized into the resin component of the foam composition prior to the mix and dispense cycle of the meter/mix dispenser. It is preferred that the resin component contain from about 1 to 10, more preferably about 5 weight percent pigment based on the weight of the resin.

Other conventional additives, e.g., crosslinkers, catalysts, blowing agents and surfactants, may be included in the foam composition, to vary its resiliency, hardness and other properties.

The ball is preferably manufactured by supporting core 12 in approximately the center of a spherical mold, e.g., by inserting a rod through the approximate center of the core, dispensing a foaming polyurethane composition into the mold, e.g., by a meter-mix/dispense apparatus, and revolving the mold (rotating the mold 360 degrees), a predetermined number of times, more preferably at least twice. Preferably, the first revolution is made immediately upon closure of the mold, after the composition is completely dispensed into the mold. Dispensing typically takes between 15 and 20 seconds, which is approximately the same amount of time it takes for foaming of the composition to begin (cream time). Cream time will depend upon the composition, mix ratio, temperature, and mixing procedure used. Cream time can be determined by observing the time at which foaming of the composition begins, under the conditions which will be used in the molding process. Further revolutions may be made immediately after the first revolution is completed. Revolution of the mold is performed in order to completely coat the inner surface of the mold cavity with foamed material. This guarantees the formation of skin on the outer surface of the ball and helps to prevent voids, pock marks and striations.

During foaming, the mold must be vented in order to allow trapped air and evolved gases to escape. It is also important to control the temperature of the two polyurethane components. The optimum reaction temperatures for the preferred compositions are from about 65° to 90° C. for the resin component and from about 75° to 100° C. for the isocyanate component. The thickness of the outer skin can be controlled by varying the mold temperature; generally the hotter the mold temperature the thinner the skin and the colder the mold temperature the thinner the skin.

Prior to demolding, the foam is allowed to cure until it has fully formed and is about 50 percent cured. The reaction time before the ball can be demolded is typically about 5 to 10 minutes for most foam compositions. After demolding, the ball is preferably suspended, for example by the ends of the rod, as there is a tendency for the ball to dent if it is placed on a surface before it is fully cured.

Preferably, the mold is teflon coated "dead soft" aluminum, grade 1100-0 and has a thickness of about ⅛". Preferably the mold is sprayed with mold release before use. Typically, the rod is removed after the foam is cured, leaving an open cylindrical hole through center of the ball.

Figure 3:
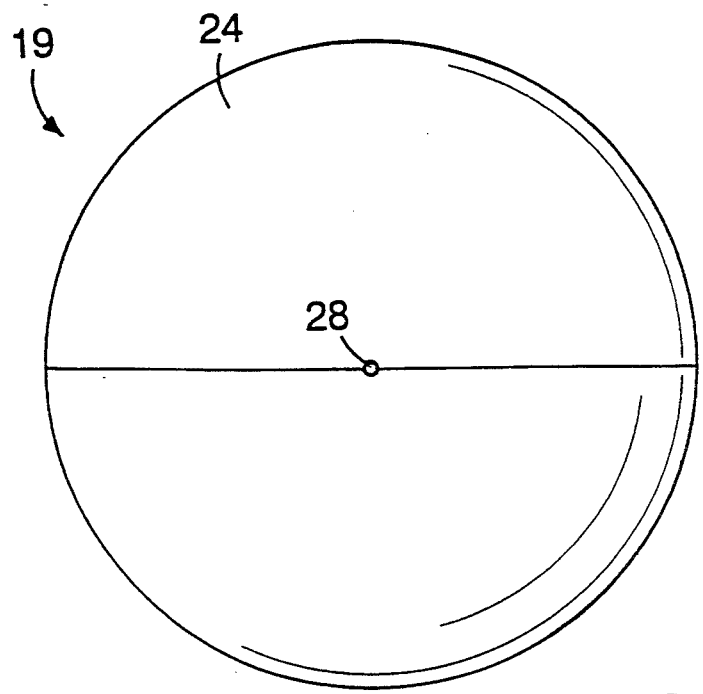
FIG. 3 is a perspective view of a mold according to one embodiment of the invention.
Figure 4:
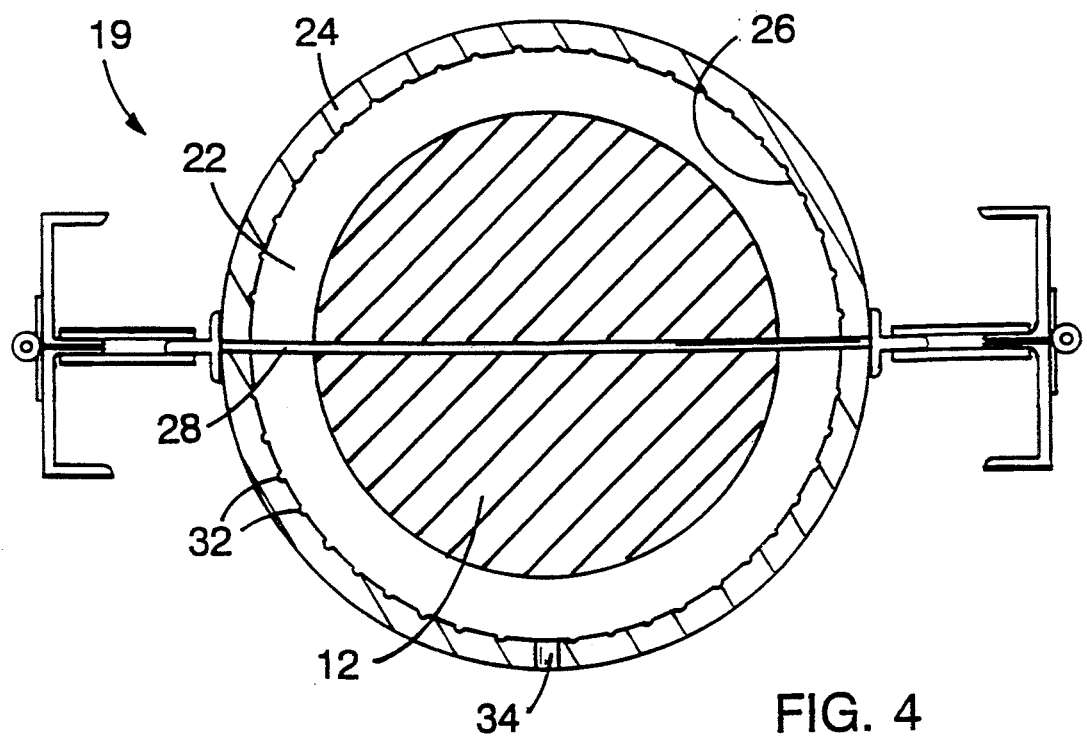
FIG. 4 is a cross-sectional view of a molding apparatus, including the mold of FIG. 3, according to one embodiment of the invention.

A preferred apparatus 19 for manufacturing a ball of the invention is shown in FIGS. 3 and 4. Apparatus 19 includes a rod 28, which is inserted through the approximate center of core 12. The center of the core can be located using a suitable jig. Rod 28 is preferably a cylindrical steel rod, having a diameter of about ⅜ inch. Mold 24 includes two hemispheres, joined at parting line 30. Rod 28 is placed in a pair of slots formed in each hemisphere at the parting line and located and dimensioned so that when the hemispheres are closed the mold will seal tightly around the rod. The hemispheres are typically clamped together during molding, and one side is preferably hinged in a manner to allow the two hemispheres to line up exactly when the mold is closed. Mold 24 has a vent hole 34, which is located at the bottom of the mold when the polyurethane composition is first dispensed into the mold. Mold 24 also includes a plurality of hemispheres 32 in its inner surface 26, which correspond to protrusions 18 in the surface of the molded ball. The polyurethane composition is dispensed into cavity 22 with the mold open, after which the two hemispheres are closed and clamped together. Revolution of the mold is typically accomplished by supporting the mold on a "cradle" jig with pillow block bearings at each side.

Other embodiments are within the following claims.

What is claimed is:

1. A non-bouncing ball comprising a spherical core of rigid material surrounded by an outer layer of molded foamed polyurethane, said core and said outer layer forming an integral solid sphere, wherein said outer layer has a higher density than said core.

2. A ball of claim 1 wherein said rigid material is selected from the group consisting of expanded polystyrene, foamed polyurethane, and composites of polyester and urethane.

3. A ball of claim 1 wherein said core has a density of from about 1 to 2 pounds/cubic foot.

4. A ball of claim 1 wherein said core weighs about 1 to 3 pounds.

5. A ball of claim 2 wherein the material of said core comprises expanded polystyrene.

6. A ball of claim 1 wherein said core comprises about 60 to 70 percent of the volume of the ball.

7. A ball of claim 1 wherein said core has a diameter of from about 1 to 5 inches less than the diameter of the ball.

8. A ball of claim 1 wherein said outer layer of foamed material has an integral non-porous skin.

9. A ball of claim 8 wherein said skin is about ⅛ inch to ¼ inch thick.

10. A ball of claim 1 wherein said ball has an outer surface defining a plurality of protrusions.

11. A ball of claim 10 wherein said protrusions are raised hemispheres.

12. A ball of claim 10 wherein said protrusions are evenly distributed over the surface of the ball.

13. A ball of claim 12 wherein said protrusions are arranged in concentric circles, offset such that any two adjacent protrusions in one circle will form an isoceles triangle with a protrusion in an adjacent circle.

14. A ball of claim 10 wherein said protrusions are arranged in concentric circles, offset such that any two adjacent protrusions in one circle will form an isoceles triangle with a protrusion in an adjacent circle.

15. A ball of claim 10 wherein said protrusions extend outwardly about 1/32 inch to ⅛ inch from the surface of the ball.

16. A ball of claim 1 having a diameter of about 18 to 28 inches.

17. A ball of claim 1 having a weight of about 18 to 28 pounds.

18. A ball of claim 1 wherein said outer layer has a thickness of from about 1 to 5 inches.

19. A ball of claim 1, wherein said outer layer has a density of 12 to 18 lbs/cubic foot.

20. A ball comprising a spherically shaped solid body, at least the outer portion of which comprises a high density integral skin foam, having on its surface a plurality of protrusions, said ball having a diameter of from about 18 to 28 inches and a weight of 18 to 28 pounds, said ball further including a low density core.

21. A ball of claim 20 wherein said protrusions are evenly spaced.

22. A ball of claim 20 wherein said protrusions are arranged in concentric circles.

23. A ball of claim 21 wherein said protrusions are arranged in concentric circles.

24. A ball comprising a low density spherical core of rigid material surrounded by a flexible high density outer layer of molded foam polyurethane, said core and said outer layer forming an integral solid sphere.

25. A ball of claim 24, wherein said outer layer has a density of 12 to 18 lbs/cubic foot.

26. A ball of claim 24 having a diameter of 18–28 inches.

27. A ball of claim 24, wherein said core has a density of 1–2 lbs/cubic foot.

28. A ball of claim 24, wherein said core has a diameter about 1 to 5 inches less than the diameter of the ball.

* * * * *